United States Patent [19]

Koeck

[11] Patent Number: 4,631,720
[45] Date of Patent: Dec. 23, 1986

[54] SERVICE INTEGRATED TRANSMISSION SYSTEM

[75] Inventor: Klaus Koeck, Backnang, Fed. Rep. of Germany

[73] Assignee: Licentia Patent-Verwaltungs-G.m.b.H., Frankfurt am Main, Fed. Rep. of Germany

[21] Appl. No.: 789,341

[22] Filed: Oct. 21, 1985

Related U.S. Application Data

[63] Continuation of Ser. No. 330,453, Dec. 14, 1981, abandoned.

[30] Foreign Application Priority Data

Dec. 13, 1980 [DE] Fed. Rep. of Germany ....... 3047045

[51] Int. Cl.[4] .............................................. H04J 3/16
[52] U.S. Cl. ........................................ 370/84; 370/99
[58] Field of Search ................. 370/41, 42, 43, 62, 370/99, 77, 84, 4, 106, 110.1, 110.2, 79; 358/141, 142, 143

[56] References Cited

U.S. PATENT DOCUMENTS 3,662,114  5/1972  Clark ................................... 370/106
3,749,841  7/1973  Cohen et al. ......................... 370/84
3,988,528 10/1976  Yanagimachi et al. ............. 358/143

FOREIGN PATENT DOCUMENTS 0012979 12/1979 European Pat. Off. .
0054120 12/1980 European Pat. Off. .
2538638  3/1977 Fed. Rep. of Germany .

OTHER PUBLICATIONS

C. R. Harris et al., "Local Network Evolution to Meet Future Telecommunications Needs", NTG-Fachberichte Issls 80, vol. 73, (1980), pp. 146–154.
Von H. Peter Glockmann, "Storage and Transmission of Analog Data by PCM-Technique", Technisches Messen ATM, vol. 43, No. 488, (1976), pp. 271–278.
Horst Besier, "Ursachen und Vorzüge der Digitalisierung", Der Übergang Zum, Digitalen Ortsnetz, (1980), pp. 646–652.

Primary Examiner—Douglas W. Olms
Assistant Examiner—Kenneth I. Rokoff
Attorney, Agent, or Firm—Spencer & Frank

[57] ABSTRACT

A method of transmitting signals of different information rates between a subscriber and a central exchange of a service integrated system operating in time multiplex wherein the signals to be transmitted are combined at the transmitting end by means of multiplexers and the transmitted signals are recovered at the receiving end by means of demultiplexers. The frequency of the time multiplex frame, i.e. the frame frequency, is selected to be equal to the smallest information rate of the signals to be transmitted and one information unit of the signal having the smallest information rate is transmitted per frame.

9 Claims, 7 Drawing Figures

SERVICE INTEGRATED TRANSMISSION SYSTEM

This application is a continuation of application Ser. No. 330,453 filed Dec. 14, 1981, now abandoned.

BACKGROUND OF THE INVENTION

The present invention relates to a service integrated transmission system operating in time multiplex. More particularly, the present invention relates to a method of transmitting signals of different information rates between a subscribing station and a central exchange of such a system wherein the signals are combined by means of multiplexers at the transmitting station and recovered by means of demultiplexers at the receiving station or end.

A system of this type is disclosed in German Offenlegungsschrift (Laid Open Application) No. 2,262,933 which discloses a method for transmitting different communications signals in a time multiplex transmission system, wherein the time multiplex frame is divided into m subframes and each subframe is divided into z time slots. The time multiplex frame is occupied with signals in such a manner that first the respective $i^{th}$ time slot of the subframe is occupied and only after the $i^{th}$ time slots in all subframes of a time multiplex frame are occupied, will an adjacent time slot in the subframes be occupied additionally. While this method of time allocation makes it possible to effect a flexible adaptation to traffic, it has the drawback that it also requires a relatively large amount of controls.

SUMMARY OF THE INVENTION

It is therefore the object of the present invention to provide a method of operating a transmission system of the above type which permits, at the transmitting end, a combination of signals of different information rates by means of multiplexers and the recovery of these transmitted multiplexed signals at the receiving end by means of demultiplexers, each by essentially inexpensive means.

The above object is basically achieved according to the present invention in that in a method of transmitting signals of different information rates between a subscriber station and a central exchange of a service integrated system operating in time multiplex including the steps of combining the signals of different information rates to be transmitted at the transmitting end of the system by time multiplexing same and recovering the time multiplexed transmitted signals at the receiving end by demultiplexing the received signals, the time multiplex frame frequency ($f_F$) is selected to be equal to the smallest information rate of the signals to be transmitted and one information unit of the signal having the smallest information rate is transmitted per frame.

The system and method according to the present invention result in the advantages that the multiplex and demultiplex formation can be effected based on an optimum time multiplex frame frequency and, due to the fact that one information unit of the signal with the smallest information rate, i.e., the most narrowband signal, is transmitted per frame, this can be effected in a substantially inexpensive manner. In one embodiment of the invention, an advantageous frame structure is provided in which the information units of the narrowband signals are accommodated in the head portion of the frame. In further embodiments of the invention it is possible also to transmit internal, slow report signals, such as alarms, stuffing control signals, etc. For the normal case in which the streams of data transmitted by a subscriber station are significantly less than the streams of data received at the subscriber's station, a further advantageous transmitting frame structure at the subscriber's end is disclosed which permits the saving of expensive means. According to a further feature of the invention, the narrowband signals are scanned with a subharmonic of the clock pulse frequency of the multiplexers, thus avoiding additional scanning and synchronization expenses. Moreover, great savings result with a digital transmission arrangement according to the invention if the bit clock pulse frequencies of the signals to be transmitted are harmonics or subharmonics of each other.

BRIEF DESCRIPTION OF THE DRAWINGS

FIG. 3b is an illustration, to an enlarged scale, of the first subframe of the receiving frame of FIG. 3a.

Figure 1:
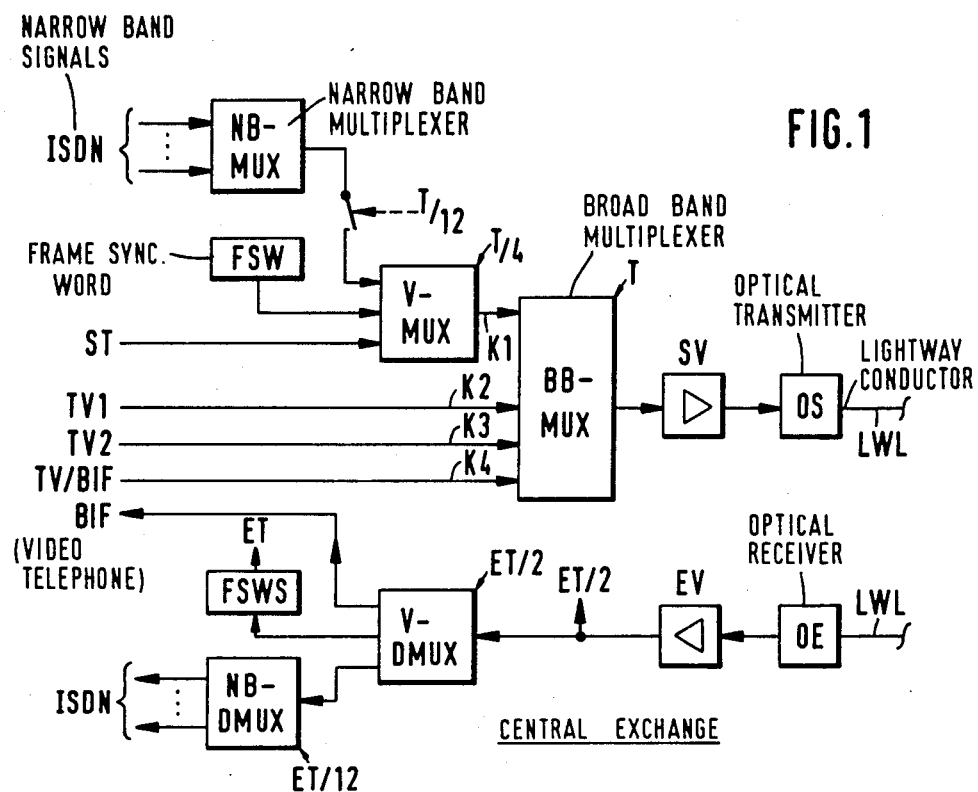
FIGS. 1 and 2 are block circuit diagrams showing the digital transmitting and receiving devices at the central station and at the subscriber station, respectively, for a service integrated system for narrowband and broadband signal channels according to one embodiment of the invention.
Figure 2:
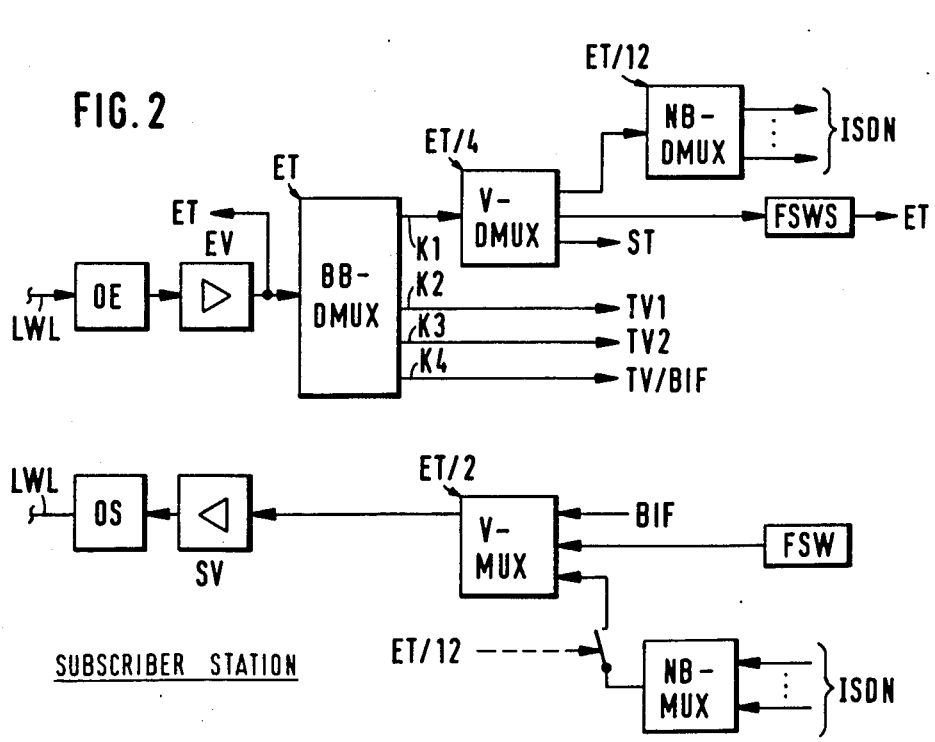
Figure 4:
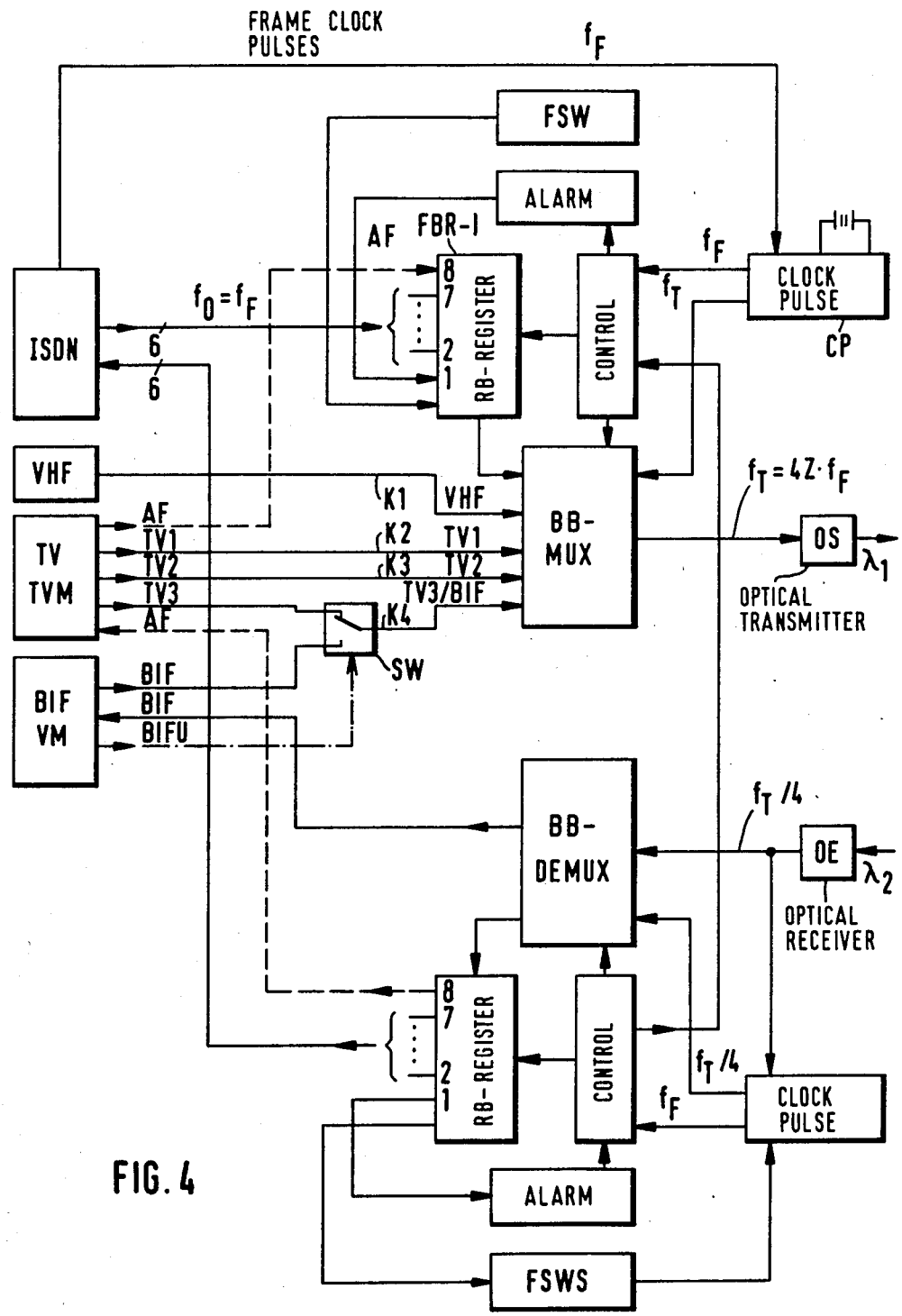
FIGS. 4 and 5 are block circuit diagrams showing the digital transmitting and receiving devices at the central station and at the subscriber station, respectively, for a service integrated system for narrowband and broadband signal channels according to a further embodiment of the invention with a frame structure as shown in FIGS. 3a and 3b.
Figure 5:
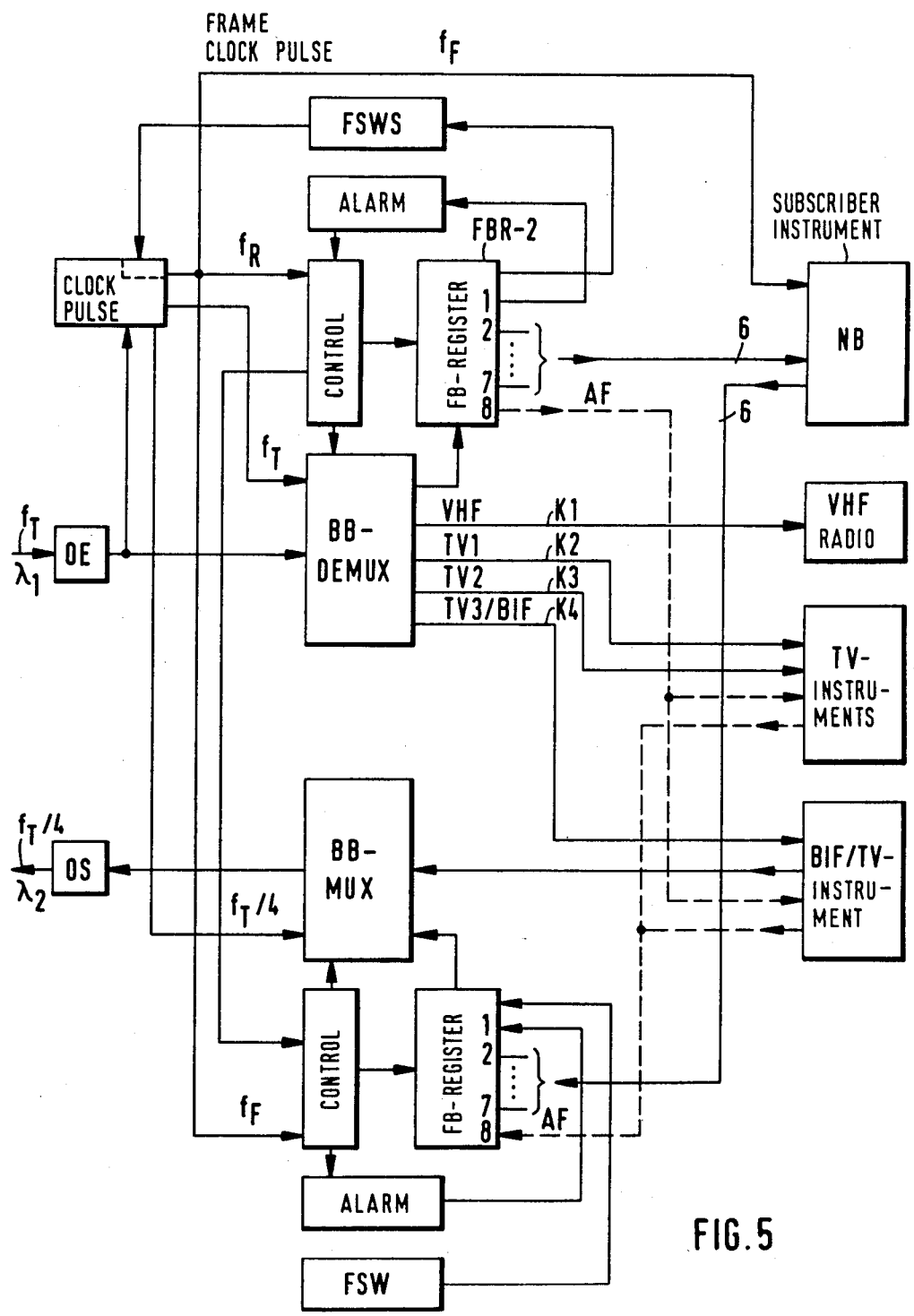

In each of the two-way transmission systems shown in FIGS. 1 and 2 and in FIGS. 4 and 5, the narrowband and broadband signal channels are combined by multiplexers at the transmitting end, which may be either the central exchange or a subscriber station, transmitted via an optical transmission system and recovered by means of demultiplexers at the receiving end.

DETAILED DESCRIPTION OF THE PREFERRED EMBODIMENTS

Referring now to FIGS. 1 and 2, there is shown an embodiment of an integrated service system according to one embodiment of the invention. In the transmitting portion of the central exchange shown in FIG. 1, the narrowband signals ISDN, which may, for example, be telex or telephone signals, which are to be transmitted to a subscriber station are combined by means of a narrowband multiplexer NB-MUX. The narrowband multiplex signal produced by the multiplexer NB-MUX, a frame sync word FSW produced by a corresponding word generator, and the signals of a number of stereo radio channels ST are then combined in a second multiplexing stage by means of a premultiplexer V-MUX into a premultiplex signal. This premultiplex signal produced by premultiplexer V-MUX is then fed to a third, and last stage multiplexer, i.e., the broadband multiplexer BB-MUX, wherein it is combined and multiplexed with three broadband signals, such as television signals TV1, TV2 and/or video telephone signals BIF. The multiplex signal produced by the broadband multiplexer BB-MUX is then fed, via a transmitting or sending amplifier SV, to an optical transmitter or sender OS whose output is connected to a lightwave conductor transmission line LWL.

The receiving arrangement at the subscriber's end or station for the just described multiplex signal is shown at the top of FIG. 2. The multiplex signal transmitted via the lightwave conductor LWL is received by an optical receiver OE and then fed via a receiving amplifier EV to a three-stage demultiplexer arrangement. In particular, the received and amplified multiplex signal is initially fed to a first stage broadband demultiplexer BB-DMUX which recovers the broadband signals TV1, TV2, TV/BIF, respectively, and the premultiplex signal which in turn is fed to the second stage or predemultiplexer V-DMUX which recovers the stereo radio signals ST, the frame sync word FSW and the narrowband multiplex signal from the premultiplex signal. Finally, the narrowband multiplex signal is fed to the third and last demultiplexing stage, i.e., the narrowband demultiplexer NB-DMUX, wherein the individual narrowband channel signals are recovered.

The transmitting arrangement at the subscriber's end or station is shown at the bottom of FIG. 2. The narrowband channels ISDN are combined by means of a narrowband multiplexer NB-MUX to form the narrowband multiplex signal, which is combined in a second multiplexing stage by means of a premultiplexer V-MUX with a frame sync word FSW and a video telephone signal BIF and transmitted to the central exchange, via the transmitting or sending amplifier SV, the optical transmitter or sender OS and the lightwave conductor transmission line LWL.

The two-stage demultiplexer arrangement at the central exchange is shown at the bottom of FIG. 1. In the optical receiver OE of the central exchange, the received optical signal is converted to an electrical signal which is amplified subsequently in the receiving amplifier EV and then fed to the predemultiplexer V-DMUX for division into the video telephone signals BIF, the frame sync word FSW and the narrowband multiplex signal. The narrowband signal is in turn fed to narrowband demultiplexer NB-DMUX wherein it is divided into the individual narrowband signals ISDN.

The advantage of this multiplex and demultiplex arrangement is that all required clock pulse frequencies can be formed in a simple manner from the bit clock pulse frequency T of the broadband multiplexer by forming subharmonics of this bit clock pulse frequency T. Thus the premultiplexer V-MUX is clocked by T/4 and the narrowband multiplexer NB-MUX is clocked by T/12.

In the receiving arrangement at the subscriber's end or station (FIG. 2), the received fast bit clock pulse ET is recovered behind the receiving amplifier EV and, in the required corresponding manner and after formation of the necessary subharmonics of ET, is fed to the demultiplexers and the multiplexers, respectively, of the subscriber station. In the receiving arrangement at the central exchange station (FIG. 1), the received bit clock pulse, which in this case is ET/2, is recovered and used in a corresponding manner.

The switch which operates with a scanning note of T/12 or ET/12 (FIGS. 1 and 2) is used if the bit rate of the narrowband multiplexer output signal is smaller than those of frame sync word FSW and stereo radio signals ST. These switches are not needed, if said bit rate is equal to T/12 or subharmonics of T/12.

Figure 2A:
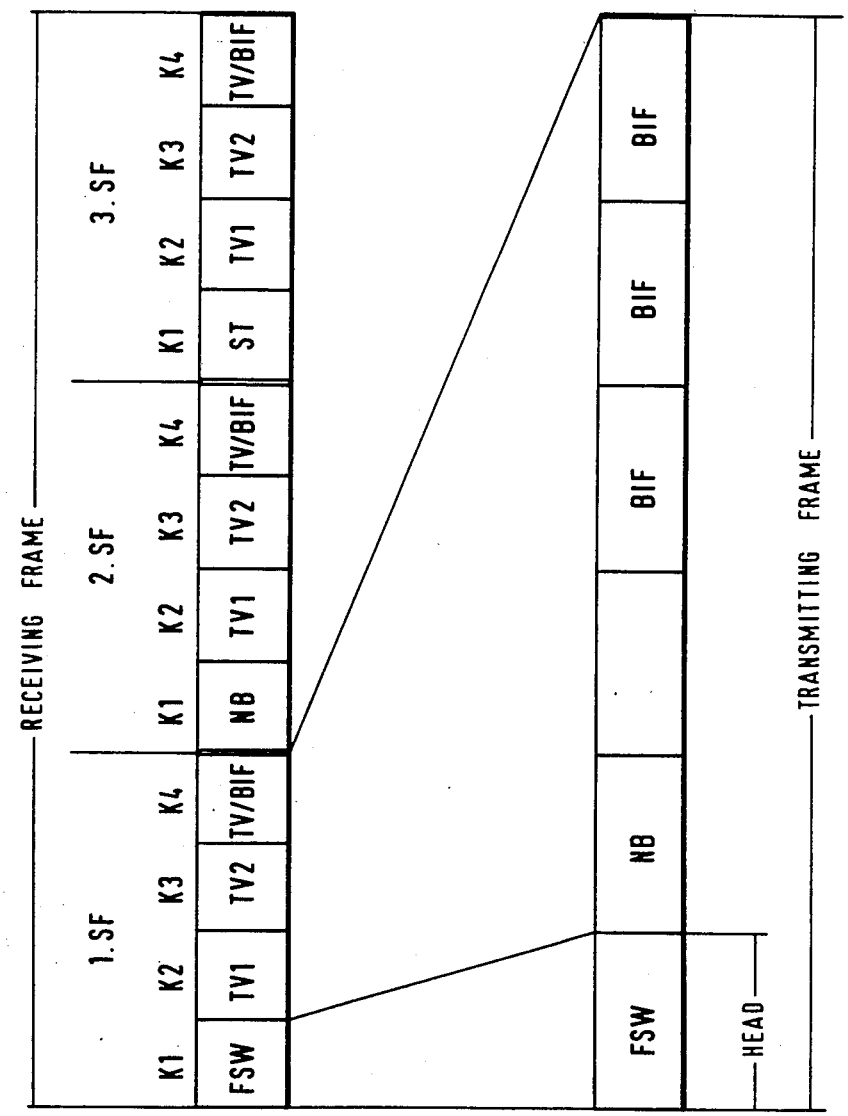
FIG. 2a is an illustration showing the receiving and transmitting frame structures at the subscriber station for the system of FIGS. 1 and 2.

FIG. 2a shows the multiplex frame structures at the subscriber's end, both with the same time span with respect to FIG. 2.

The receiving frame is subdivided into 3 subframes SF, with each individual subframe being again divided into a head and an information portion. For the illustrated embodiment, the head portion consists of 1 bit, characterizing the frame sync word FSW in the 1.SF and a Narrowband signal NB and the stereo sound channels ST in the other 2 subframes, respectively. The information portion consists of 3 bits of the channels K2 to K4, containing TV- and TV1BIF-signals. Interlacing bit-by-bit this arrangement leads to a very inexpensive multiplexer and demultiplexer realisation. The transmitting frame consists of 6 bits, the 1st bit being the head with the frame sysnc word FSW and the other bit containing 1 or 2 narrowband signals NB and 3 BIF-signals, and has a bit rate half of that of the receiving frame.

The embodiment of the invention described with respect to FIGS. 1 and 2 is of advantage whenever the bit or information rate of the stereo sound channels ST is smaller than the bit rate of the television channels. However, if the bit rates of the stereo sound channels ST and television channels are the same or approximately the same, then it is preferable to form the transmitted multiplex signal using the transmission system arrangement as shown, for example, in FIGS. 4 and 5, whose multiplex frame structure is shown in FIGS. 3a and 3b.

Figure 3A:
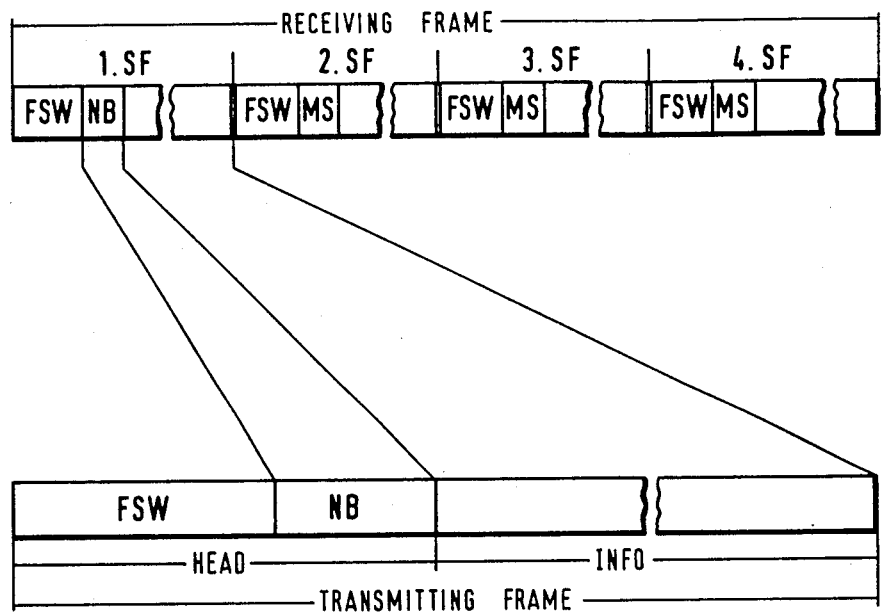
FIG. 3a is an illustration showing the receiving frame and the transmitting frame structures at the subscriber station according to a further embodiment of the invention.
Figure 3B:
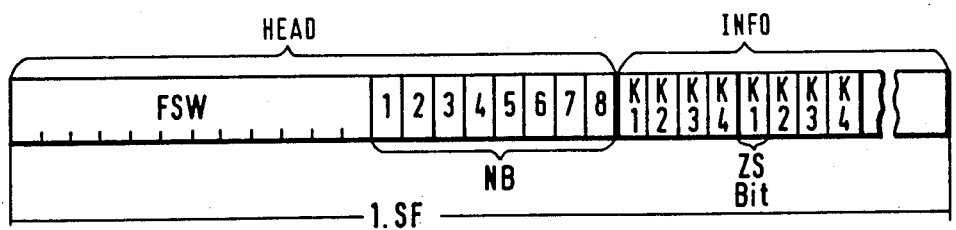

FIGS. 3a and 3b each show the multiplex frame structures at the subscriber's end, with FIG. 3a showing the receiving frame above the transmitting frame (both with same time span). FIG. 3b shows a portion of the first subframe of the receiving frame of FIG. 3a to an enlarged scale.

As shown, the receiving frame of FIG. 3a is subdivided into a plurality N of subframes SF (with N being equal to 4 in the illustrated example), with each individual subframe being again divided into a head and an information portion. According to the present invention, the frame sync word FSW and the narrowband signals NB are accommodated in the head portion of the frame. In the illustrated embodiment, the head portion includes a total of 20 bits, while the frame sync word comprises 12 bits. Consequently, there is room for 1 bit of up to 8 narrowband signals behind the frame sync word (FIG. 3b). In the information portion of the frame, which may comprise, for example, 40×20 bits, the broadband channels K1 to K4 are interlaced bit by bit. In the assumed example, the eight narrowband channels each have the same bit rate which corresponds to the frame frequency $f_F$. The locations in the head portion of the other subframes, i.e. subframes SF 2-N, intended for the narrowband transmission thus remain unoccupied. However, these locations can advantageously be occupied with report signals of all types, such as alarms, stuffing control signals, etc. According to the invention, the transmitting frame in the subscriber's arrangement has exactly the same frequency $f_F$ as the receiving frame and the same structure as the first subframe of the receiving frame, but with each time slot or location of the transmitting frame being four times as great as the corresponding time slot in the subframe of the receiving frame corresponding to the four times higher receiving bit rate at the subscriber's end or station.

Due to the fact that the frame sync word is repeated in each subframe of the receiving frame, the synchronization period at the subscriber's end is shortened. The identical frame and subframe structure brings about the advantage that the same sequence controls can be used in both transmission arrangements of the two way system with these controls being merely clocked at different rates. Moreover, only a single clock pulse processing circuit "CLOCK PULSE" is required at the subscriber's end.

FIGS. 4 and 5 show the transmission and receiving arrangements at the central exchange and at the subscriber's station, respectively, for a second embodiment of the present invention. As in FIGS. 1 and 2, there is a mirror-image arrangement in FIGS. 4 and 5 between the associated transmitting and receiving arrangements and the repeated use of identical component groups, such as e.g. frame sync word memories and frame sync word evaluation FSW, frame begin registers FB-Register, alarm or report component, control and clock pulse component, etc. The use of identical component groups is of great economical significance at the local exchange level since the degree of high integration is a function of the number of units involved.

According to the embodiment of the invention shown in FIGS. 4 and 5, the narrowband signals ISDN (six such channels being indicated) are made available in the frame begin register FBR-1 with the ISDN bit clock pulse $f_O$, which is identical with the frame clock pulse $f_F$, together with the frame sync word FSW, a narrowband report/alarm channel, and a narrowband television request channel AF. Thus, the FB-Register contains all of the information for the head portion of a frame as shown in FIG. 3a, i.e. a frame sync word and eight narrowband channels. At the beginning of a frame, the frame begin register FBR-1 is read out at the fast bit clock pulse $f_T$ via the broadband multiplexer BB-MUX. As shown, the fast bit clock pulse $f_T$ is generated in the clock pulse circuit CP from the frame clock pulse rate $f_F$ and, in the illustrated system with four subframes per frame, is equal to $4Z \cdot f_F$ where Z is the number of bits in a subframe. After the head portion of the frame is transmitted, the central exchange transmits the four broadband channels VHF, TV1 to TV3, in a bit-by-bit interlaced manner, as shown in FIG. 3a, via the broadband multiplexer BB-MUX and the optical transmitter OS to the subscriber station as shown in FIG. 5. As indicated in FIGS. 4 and 5, the transmission in one direction is preferably at a first optical wavelength $\lambda_1$, with the transmission in the opposite direction being at a different wavelength $\lambda_2$.

The broadband channels have the same bit rate which, depending on the redundance reduction factor of the television or videotelephone signals transmitted in future integrated local networks, is about 30 to 140 Mbit/sec. As shown, the fourth broadband channel can be occupied selectively by a television channel (TV3) or a videotelephone channel (BIF) by selectively controlling a switch SW with the videotelephone switching signal (BIFU). Of course, other alternatives, such as three television channels and a bundle of VHF channels multiplexed with the videotelephone, are also conceivable.

At the subscriber's station shown in FIG. 5, the received signal is fed to the broadband demultiplexer BB-DMUX which separates the head portion of a received subframe from the information portion, with the head portion of the received subframe being entered into the frame begin register FBR-2 while the four broadband signals VHF, TV1, TV2 and TV3/BIF are forwarded to the respective end devices. The frame begin register FBR-2 is then read out to provide the frame sync word to a frame sync word storage and evaluation circuit FSWS for use in synchronizing the clock pulse circuit while the various narrowband signals are fed to the respective end instruments or circuits of the subscriber station. With this arrangement, an evaluation period of ¼ the frame duration is available for the recognition of the frame sync word. By means of the clock pulse supply, the fast bit clock pulse $f_T$ is obtained from the output signal of the optical receiver OE and the further operating clock pulses for the subscriber station are obtained by division by the factor 4 or 4z, respectively, with z time slots per subframe.

As with the embodiment of FIGS. 1 and 2, the return transmission channel from the subscriber station to the central exchange of FIGS. 4 and 5 operates in a similar manner to the forward channel but each frame is transmitted at a lower bit rate.

It will be understood that the above description of the present invention is susceptible to various modifications, changes and adaptations, and the same are intended to be comprehended within the meaning and range of equivalents of the appended claims.

What is claimed is:

1. In a method of transmitting signals of different information rates between a subscriber station and a central exchange in a service integrated transmission system operating in time multiplex and with two-way transmission between the subscriber station and the central exchange, said method including combining the data signals of different information rates to be transmitted at the transmitting end of the system by time multiplexing same, transmitting the time multiplexed signals within a multiplexing bit stream having a clock pulse frequency according to the entire operating information rate, and recovering the original data signals at the receiving end by demultiplexing the received signals; the improvement comprising: selecting a time multplex frame frequency equal to the smallest information rate of the data signals to be transmitted; transmitting one information unit of a data signal having the smallest information rate per frame; and, causing said step of combining at said central station to include: providing each transmitting frame, and hence the receiving frame at the subscriber station, with N subframes, each including a head portion and an information portion of respective constant lengths, and with a multibit frame sync word being accommodated in said head portion of each said subframe, said information units of said data signals having the smallest information rate (narrowband signals) being accommodated in said head portions of said subframes, the data signals of larger information rate being accommodated in said information portion of each said subframe, each subframe being subdivided into z time slots each accommodating only one information unit of said signals being transmitted, and successive said time slots being associated with different ones of said data signals.

2. A method as defined in claim 1 wherein said information units of the signals having the smallest information rate are accommodated in the head portion of at least the first subframe of said transmitting frame of the central exchange.

3. A method as defined in claim 1 wherein said signals having the smallest information rate are telex or telephone signals and, additionally, internal report signals provided with the same said smallest information rate.

4. A method as defined in claim 3 including: at said central exchange, transmitting said telex or telephone signals in the head portion of said first subframe and transmitting said internal report signals in said head portions of subframes 2 through N.

5. A method as defined in claim 1, 2 or 4 including transmitting signals from the central station to the subscriber station with an entire information rate which is a whole number multiple N of the information rate of the signals transmitted from the subscriber station to the central exchange.

6. A method as defined in claim 5 including generating, in the subscriber station, a transmitting frame which has the same arrangement as said subframe of the receiving frame of the subscriber station.

7. A method as defined in claim 1 wherein said signals having the smallest information rate are sampled and transmitted with a subharmonic of the clock pulse frequency of the multiplexer bitstream.

8. A method as defined in claim 1 or 7 wherein said signals to be transmitted have the same bit clock pulse frequencies or their harmonics, respectively.

9. A method as defined in claim 1 wherein each said data signal of larger information rate is cyclically associated with a plurality of said time slots in said information portion of each said subframe.

* * * * *